United States Patent [19]

Oude Alink et al.

[11] Patent Number: 5,197,545

[45] Date of Patent: Mar. 30, 1993

[54] VOLATILE CORROSION INHIBITORS FOR GAS LIFT

[75] Inventors: Bernardus A. M. Oude Alink; Richard L. Martin, both of St. Louis; James A. Dougherty, Manchester; Benjamin T. Outlaw, St. Louis, all of Mo.

[73] Assignee: Petrolite Corporation, St. Louis, Mo.

[21] Appl. No.: 769,313

[22] Filed: Oct. 1, 1991

[51] Int. Cl.$^5$ .............................................. E21B 43/00
[52] U.S. Cl. .................................. 166/372; 166/902; 252/8.555; 417/55
[58] Field of Search ............... 166/310, 371, 372, 902; 252/8.555; 417/54, 55

[56] References Cited

U.S. PATENT DOCUMENTS

| | | | |
|---|---|---|---|
| 2,461,359 | 2/1949 | Viles et al. | 252/8.555 |
| 2,809,698 | 10/1957 | Bond et al. | 166/310 X |
| 2,925,781 | 2/1960 | Fischer | 252/8.555 X |
| 3,770,055 | 11/1973 | Larsen | 166/310 X |
| 4,101,441 | 7/1978 | Hwa et al. | 252/8.555 X |
| 4,347,899 | 9/1982 | Weeter | 166/372 X |
| 4,446,056 | 5/1984 | Thompson | 252/8.555 X |
| 4,454,914 | 6/1984 | Watanabe | 166/310 X |
| 4,477,674 | 10/1984 | Alink | 548/146 |
| 4,555,576 | 11/1985 | Oude Alink | 548/146 |
| 4,941,994 | 7/1990 | Zetlmeisl et al. | 252/389.24 X |

Primary Examiner—George A. Suchfield
Attorney, Agent, or Firm—Kenneth Solomon

[57] ABSTRACT

A method is disclosed for volatile inhibition and transport of inhibitor in the volatile phase to produced liquids of corrosion in a gas lift process in which a lift gas is pumped into a well to facilitate petroleum production of the well. The method comprises introducing to the lift gas a corrosion-inhibiting amount of a dihydrothiazole of the formula

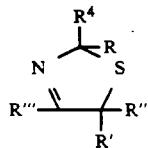

wherein R, R', R", R''', and R$^4$ are independently selected from among hydrogen and alkyl groups of up to about 3 carbon atoms, provided that the total number of carbon atoms of R, R', R", R''' does not exceed about 14.

13 Claims, No Drawings

VOLATILE CORROSION INHIBITORS FOR GAS LIFT

BACKGROUND OF THE INVENTION

1. Field of the Invention

The present invention relates to vapor phase corrosion inhibition and to vapor phase transport of corrosion inhibitors, and more particularly to inhibition of corrosion due to carbon dioxide and hydrogen sulfide in gas lift processes.

2. Description of the Prior Art

Gas lift is a technique applied to oil wells to produce fluids from the wells after the natural flow from the well ceases or to supplement the natural flow. According to this technique, when the pressure in the well in insufficient to eject subterraneous fluids up through the well for collection at an acceptable rate, gas from a subterraneous formation is collected and injected at high pressure down the annulus of the well to displace the fluid from the point of gas injection to the surface. Typically such gas is methane, but other gases may also be present in minor amounts and exacerbate corrosion problems in the gas lift system and well. Moreover, the produced liquids themselves may contribute $CO_2$ and $H_2S$ to the system.

Each well may be equipped with a pump for compressing the gas and injecting it into the well. However, a large number of wells often populate a localized area of several square miles and it is economically advantageous to use a single pump to service all such wells. For example, 500 wells over 40 platforms might populate an offshore producing area. Thus, instead of employing 500 pumps (or 40 pumps), a single pump can be employed with conduits communicating between the pump and each of the 500 wells.

An intractable problem associated with this technique, however, has been the carbon dioxide and/or hydrogen sulfide corrosion of metal surfaces in the system, including surfaces of numerous conduits that carry production fluids and metal surfaces within the well. Such problems include the difficulty in maintaining a corrosion inhibitor in a vapor phase, particularly through the lengths of conduits to the wells. As a result, corrosion inhibitors have been added to the lift gas at the well sites, thereby requiring an injection pump at each well site for the injection of the inhibitor at that site. Accordingly, 500 relatively localized wells would require 500 pumps.

Another problem is that conventional corrosion inhibitors, regardless of their effectiveness in other applications, have not been found to be sufficiently effective in inhibiting corrosion in the vapor phase. Thus, for example, although U.S. Pat. No. 4,555,576 to Oude Alink, a co-inventor herein, notes in passing that the compositions of that patent may be useful as corrosion inhibitors, it contains no suggestions that such compositions would be useful as vapor phase inhibitors. In fact, most such compositions as broadly defined in U.S. Pat. No. 4,555,576 have a molecular weight too high to permit an effective vapor phase concentration. For example, the only such dihydrothiazole known to the inventors to be commercially employed as a component in an inhibitor package is 2,5-dihydro-2,2-pentamethylene-5,6-tetramethylene thiazole, which has a boiling point too high to be a practical vapor phase inhibitor. Generally, however, corrosion inhibitors have been found to be of insufficient effectiveness in vapor phase applications, and typically must be employed in combination with a neutralizer, usually an amine.

Moreover, it is recognized that in order for an inhibitor to inhibit corrosion of a metal surface, the inhibitor must show an affinity for that surface, thereby to provide effective inhibition. Conventional inhibitors have been adapted to exhibit greater affinity to metal surfaces by increasing the size of the inhibitor. In the case of a vapor phase inhibitor, such techniques are self-defeating because it converts the inhibitor to a liquid phase.

Accordingly, the industry is still searching for effective vapor phase or volatile corrosion inhibitors that may be employed in gas lift technology not only to afford corrosion protection to surfaces contacted by the vapors, but also to provide equally distributed corrosion inhibitor into the well-produced fluids. A vapor phase inhibitor is sought therefore, that would provide equal distribution from an injection point or a plurality of injection points to inhibit corrosion in the produced liquids (which contain, for example, carbon dioxide or hydrogen sulfide). Such distribution has not been found to result from the application of liquid inhibitors through manifolds.

SUMMARY OF THE INVENTION

Briefly, therefore, the present invention is directed to a novel method for volatile inhibition of corrosion and transportation of corrosion inhibitor in a gas lift process in which a gas is pumped into a well to facilitate petroleum production of the well. The method comprises introducing to the gas a dihydrothiazole of the formula

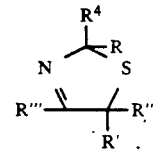

where R, R', R'', R''' and $R^4$ are independently selected from among hydrogen and alkyl groups of up to about 3 carbon atoms, provided that the total number of carbon atoms of R, R', R'', R''' and $R^4$ does not exceed about 14.

Among the several advantages found to be achieved by the present invention, therefore, may be noted the provision of a method for inhibiting corrosion in gas lift techniques; the provision of such method which may be introduced ahead of a gas pump which delivers compressed gas to several wells; and the provision of such method in which an effective amount of corrosion inhibitor may be maintained within the vapor phase of a system.

DETAILED DESCRIPTION OF THE PREFERRED EMBODIMENTS

In accordance with the present invention, it has been discovered that introducing certain dihydrothiazoles to the gas in a gas lift process surprisingly provides far more effective volatile corrosion inhibition and transport than has been achieved with other conventional corrosion inhibitors and continues to provide corrosion inhibition when dissolved into well production fluids. Vapor phase transport of such inhibitors provides distribution and transport of the inhibitor throughout the lift and well system.

The dihydrothiazoles found to be effective in this process include 2,5-dihydrothiazole of the formula

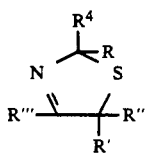

wherein R, R', R'', R''' and R⁴ may be, independently, hydrogen, methyl, ethyl or n-propyl or isopropyl. However, the total number of carbon atoms of R, R', R'', R''' and R⁴ should not exceed about 14. It is a particular advantage that the dihydrothiazole have low molecular weight in order to increase its volatility, thereby permitting maintenance of higher vapor phase concentrations of the dihydrothiazole. Thus, it is especially preferred that R''' be hydrogen. Moreover, it is also desirable that R is hydrogen and R⁴ is isopropyl. It is also preferred that each of R, R', and R'' is methyl. Optimally, therefore, R, R' and R'' are each methyl, R and R''' are each hydrogen and R⁴ is isopropyl.

Methods for preparation of such dihydrothiazoles are described in U.S. Pat. Nos. 4,477,674 and 4,555,576. In short, a 2,5-dihydrothiazole may be prepared by heating a mixture of elemental sulfur and a compound of the formula

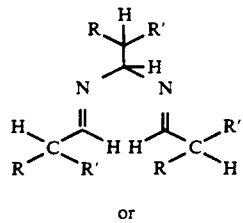

Compound I or

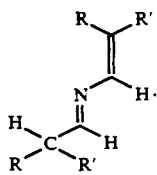

Compound II wherein R and R' are, independently, hydrogen, methyl, ethyl or propyl, in stoichiometric amounts at a temperature of from about 40° C. to about 160° C. for about one to about 24 hours. As noted in U.S. Pat. No. 4,555,576, Compound II may be formed by heating Compound I and Compound I may be prepared by reaction of ammonium hydroxide with a compound of the formula

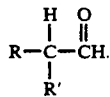

Thus, a dihydrothiazole utilized in this invention may be prepared from ammonium hydroxide, sulfur and, for example, isobutyraldehyde.

A 4,5-dihydrothiazole may be prepared by heating the 2,5-dihydrothiazole at high temperatures; e.g., about 160° C. to about 250° C. Alternatively, a 4,5-dihydrothiazole may be formed by reaction of an unsaturated imine such as aza-alkylene-diene with elemental sulfur at a temperature of about 160° C. to about 250° C.

The dihydrothiazoles may be injected into the gas lift system after the compression pump and is thereby distributed to each well. The dihydrothiazole may be injected as a liquid through a nozzle in accordance with standard techniques for injection of volatile corrosion inhibitors. Upon injection, the dihydrothiazole volatilizes and retains an effective vapor phase concentration for corrosion inhibition, generally from about 1 ppm by weight to about 1000 ppm by weight, preferably about 10 pp by weight to about 100 ppm by weight, based on total well production. Moreover, despite the relatively low molecular weight, the dihydrothiazole seems to show a strong affinity for metal surfaces, thereby providing excellent protection of the surface against corrosion. It is believed that this apparent affinity results from a sulfur/iron bond between the dihydrothiazole and the metal surface.

In addition, the dihydrothiazoles are oil-soluble and so ultimately wind up in the hydrocarbon pumped from the well. Accordingly, the dihydrothiazole may be removed during the standard refining processes to which the hydrocarbon is subjected. Thus, additional waste treatment steps that would be required to treat the waste water if the inhibitor migrated to the water phase may be unnecessary.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE I

Into a reactor was placed 2-butanone (423.9 grams) and elemental sulfur (92.9 grams). Ammonia gas was introduced over a five hour period into the closed reactor while the temperature was maintained below 62° C. by cooling. After the ammonia addition was completed, the mixture was stirred for five more hours under a positive ammonia pressure. Two liquid layers were produced and separated, and the organic top layer was evaporated under diminished pressure to yield 2,5-dihydro-2,4,5-trimethyl-5-ethylthiazole (355.5 grams). The synthesis of 2,5-dihydro-2,4,5-trimethyl-2-ethylthiazole yielded a product shown by GC to consist of two well separated components present in about equal amounts. The product had a boiling point of 73°–75° C. at 13 mm Hg and was soluble in all common organic solvents. A similar synthesis with acetone as the starting ketone was not very efficient, and mainly unidentifiable tars were isolated. When cyclohexanone was used as the ketone, the product 2,5-dihydro-2,2-penta-methylene-4,5-tetramethylene-thiazole was a solid, m.p. 82° C., b. 156°–157° C. at 11 mm Hg, which could be prepared in 80% yield.

EXAMPLE II

When isobutyraldehyde was reacted under conditions similar as described in Example I, above, for the preparation of dihydrothiazoles from ketones, no incorporation of sulfur occurred. However with a variation in the reaction, secondary aldehydes could be made to yield dihydrothiazoles in excellent yield. The reaction of isobutyraldehyde with ammonia yielded, via an intermediate, 2,6-dimethyl-4-azahepta-2,4-diene.

The imine function activates the C—H bond adjacent to it and allows insertion of sulfur in the C—H bond. The thiol generated adds to the vinylimine group to form 2,5-dihydro-5,5-dimethyl-2-(l-methylethyl)-thiazole. This reaction can also be carried out with 2-ethylbutyraldehyde to yield the higher homologue, 2,5-dihydro-5,5-diethyl-2-(i-ethylpropyl)-thiazole.

EXAMPLE III

Tests were conducted on various corrosion inhibitors to determine their efficacy in lift gas at ambient temperature. First, the efficacy of various volatile amines and polyamines was evaluated at a concentration of 250 ppm by weight in carbon dioxide saturated 3% brine at ambient temperature for 24 hours. In each test, the corrosion rate for the blank coupon was measured at 60 mpy. In the first test, little, if any, corrosion protection was found for isopropylamine and about 50% corrosion protection was found for cyclohexylamine and for octylamine. In the second test, slightly more than 50% corrosion protection was found for diethylamine and about 67% corrosion protection was found for dicyclohexylamine and for dimethylcocoamine. In the third test, about 25% to about 35% corrosion protection was found for each of mono-, di- and tri-ethanolamine and morpholine. In the fourth test, about 40%, 60%, 75% and 80% corrosion protection was found for ethylenediamine, diethylenetriamine, triethylenetetraamine and Tetramine #2 (a poly-ethyleneamine from Union Carbide), respectively. Alkylpyridines, hexamethylenetetramine and piperazines were found to provide about 50% corrosion protection.

EXAMPLE IV

Four types of dihydrothiazoles were tested as vapor phase corrosion inhibitors according to the test procedures of Example III, above. Corrosion inhibition of about 50% was found for 2,4,5-trimethyl-2-ethylthiazole, and of better than 90% was found for 5,5-dimethyl-2-(I-methylethyl)-thiazole and for 5,5-diethyl-2-(1-ethylpropyl)-thiazole, with the former showing greater efficacy.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for vapor phase corrosion and transport a of corrosion inhibitor in a vapor phase to subsequent liquid corrosion sites in a gas lift process in which a lift gas is pumped into a well to facilitate petroleum production of the well, comprising introducing to the lift gas a corrosion-inhibiting amount of an inhibitor comprising a dihydrothiazole of the formula

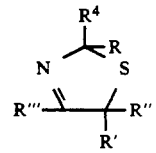

wherein R, R', R", R''' and $R^4$ are independently selected from the group consisting of hydrogen and alkyl groups of up to about 3 carbon atoms, provided that the total number of carbon atoms of R, R', R", R''' and $R^4$ does not exceed about 14.

2. A method as set forth in claim 1 wherein R''' is hydrogen.

3. A method as set forth in claim 2 wherein R' and R" are each methyl.

4. A method as set forth in claim 3 wherein R and R''' are each hydrogen.

5. A method as set forth in claim 4 wherein $R^4$ is isopropyl.

6. A method as set forth in claim 1 wherein the lift gas comprises mostly methane.

7. A method as set forth in claim 6 wherein the lift gas further comprises carbon dioxide.

8. A method as set forth in claim 7 wherein the lift gas further comprises hydrogen sulfide.

9. A method as set forth in claim 6 wherein the lift gas further comprises hydrogen sulfide.

10. A method as set forth in claim 1 wherein the inhibitor is transported in the volatile phase and enters production liquids to provide corrosion protection.

11. A method as set forth in claim 1 wherein the amount of dihydrothiazole introduced to the gas is sufficient to produce a dihydrothiazole concentration in the lift gas in the range of from about i ppm by weight to about 1000 ppm by weight.

12. A method as set forth in claim 1 wherein the dihydrothiazole was prepared from a condensation of 2-butanone, isobutyraldehyde, ammonia and sulfur.

13. A method as set forth in claim 1 wherein the dihydrothiazole was prepared by a condensation of 2-butanone, ammonia and sulfur.

* * * * *